(12) United States Patent
Esteban-Martin et al.

(10) Patent No.: US 8,498,043 B2
(45) Date of Patent: Jul. 30, 2013

(54) OPTICAL PARAMETRIC OSCILLATOR WITH OPTIMIZED OUTPUT COUPLING

(75) Inventors: Adolfo Esteban-Martin, Castelldefels Barcelona (ES); Majid Ebrahim-Zadeh, Castelldefels Barcelona (ES)

(73) Assignee: Fundacion "Instituto de Ciencias Fotonicas" (ICFO) (ES)

( * ) Notice: Subject to any disclaimer, the term of this patent is extended or adjusted under 35 U.S.C. 154(b) by 264 days.

(21) Appl. No.: 13/025,843

(22) Filed: Feb. 11, 2011

(65) Prior Publication Data

US 2011/0194172 A1 Aug. 11, 2011

(30) Foreign Application Priority Data

Feb. 11, 2010 (EP) .................................... 10153331

(51) Int. Cl.
*G02F 1/39* (2006.01)
(52) U.S. Cl.
USPC ................................ 359/330; 372/22; 372/94
(58) Field of Classification Search
USPC .................. 359/326–332; 372/21, 22, 92, 94, 372/99, 100, 102
See application file for complete search history.

(56) References Cited

U.S. PATENT DOCUMENTS

| | | | |
|---|---|---|---|
| 3,869,210 A | 3/1975 | Fletcher | |
| 5,341,236 A * | 8/1994 | Stappaerts | 359/328 |
| 5,995,522 A * | 11/1999 | Scherrer et al. | 372/21 |
| 6,647,033 B1 | 11/2003 | Smith | |
| 2005/0243876 A1 * | 11/2005 | Kung | 372/21 |
| 2007/0291801 A1 * | 12/2007 | Caprara et al. | 372/22 |

OTHER PUBLICATIONS

J. Pinard and J.F. Young, "Interferometric stabilization of an optical parametric oscillator", Opt. Comm., vol. 4 (1972), p. 425.*
Boon-Engering et al., "Highly efficient single-longitudinal-mode Beta-BaB2O4 optical parametric oscillator with a new cavity design", Opt. Lett., vol. 20 (1995), p. 2087-2089.*
M. Martinelli, "Ultra-low threshold CW triply resonant OPO in the near infrared using periodically poled lithium niobate", Journal of Optics A: Pure and Applied Optics, 3(2001) 300-303.
Kenju Otsuka, "Nonlinear antiresonant ring interfermeter", Optics Letters, Sep. 1983, vol. 8, No. 9, XP-002590321.
A.E. Siegman, "An Antiresonant Ring Interferometer for Coupled Laser Cavities, Laser Output Coupling, Mode Locking and Cavity Dumping", IEEE Journal of Quantum Electronics, Feb. 1973, XP-000916298.
Xianmei Meng, "Bidirectional, synchronously pumped, ring optical parametric oscillator", Optics Letters, Mar. 2001, vol. 26, No. 5, XP-002590320.

* cited by examiner

*Primary Examiner* — Daniel Petkovsek
(74) *Attorney, Agent, or Firm* — Cantor Colburn LLP (57) ABSTRACT

An optical parametric oscillator including a nonlinear crystal pumped by a laser source and an optical resonator, including an optical interferometer, which determines a level of output coupling of the oscillator, allowing high stability, broad wavelength tuning, and output power level optimization.

13 Claims, 8 Drawing Sheets

OPTICAL PARAMETRIC OSCILLATOR WITH OPTIMIZED OUTPUT COUPLING

TECHNICAL FIELD

The present invention has its application within the optical communication sector and, especially, in the industrial area engaged in providing optical oscillators.

BACKGROUND

An antiresonant ring interferometer (ARR) is an optical interferometer in which a beamsplitter (BS) separates an input beam ($E_{in}$) into two beams (clockwise and counter clock-wise). After propagation inside the ring, and transmission or reflection by the beamsplitter again, the new pairs of fields interfere, giving rise to the final reflected and transmitted output fields ($E_r$ and $E_t$).

The ARR can be treated mathematically as a 4-port optical splitter whose transfer matrix is given by $$M_{ARR} = \begin{bmatrix} t & r \\ -r & t \end{bmatrix},$$

where r and t are the amplitude reflectance and transmittance, respectively. Moreover, as two of the ports are connected by the ring, the reflected and transmitted fields from the ARR are given by $$\begin{bmatrix} E_r \\ E_t \end{bmatrix} = M_{ARR}^2 \begin{bmatrix} E_2 \\ E_1 \end{bmatrix}.$$

In the particular case where $$\begin{bmatrix} E_2 \\ E_1 \end{bmatrix} = \begin{bmatrix} 0 \\ E_{in} \end{bmatrix}, \text{ then } \begin{bmatrix} E_r \\ E_t \end{bmatrix} = \begin{bmatrix} 2tr \\ t^2 - r^2 \end{bmatrix} E_{in},$$

implying that after recombination at the beamsplitter, the reflected fields interfere in phase, whereas the transmitted fields are of opposite phase. Finally, identifying $R=r^2$ and $T=t^2$ (R and T being the reflectance and transmittance of the beamsplitter), the global reflectance and transmittance of the ARR result as $R_{ARR}=4RT$ and $T_{ARR}=|R-T|^2$.

ARRs have already been used in laser systems, such as the one disclosed by U.S. Pat. No. 3,869,210. In the said laser systems, the ARR are used, along with other elements, for different functions, such as combining two independent laser sources, optical pulse switching or laser mode locking.

An Optical Parametric Oscillator (OPO) is a light source comprising an optical resonator and a nonlinear optical crystal pumped by a laser. It converts an input laser wave (with a frequency $w_{pump}$) into two output waves of lower frequency ($w_{signal}$, $w_{idler}$), where $w_{pump}=w_{signal}+w_{idler}$, by means of the nonlinear optical interaction known as parametric down-conversion. The gain allows the resonating wave to oscillate in the optical cavity, compensating the loss that the resonating wave experiences in each round-trip. A main feature of OPO is that wavelengths can be varied over a wide range by altering the phase-matching condition, $k_{pump}=k_{signal}k_{idler}$, of the nonlinear optical crystal, where $k_{pump,signal,idler}$ are the wave vectors of the pump, signal and idler, respectively. For instance, one can change the crystal temperature, crystal orientation or optical length of the resonator.

Many OPOs are known, such as those disclosed in US 2007/0291801A1 or US2005/0243876 A1, but in many cases they suffer from elaborate designs, non-optimum output coupling, and wavelength dependence of extracted output power.

There is thus a need for state-of-the-art optical parametric oscillators with a high stability, a wide wavelength range, and optimized output power.

SUMMARY OF THE INVENTION

The current invention solves the aforementioned problems by disclosing a stable optical parametric oscillator (OPO), in which the usual scheme of a nonlinear crystal pumped by a laser source, and an optical resonator, is improved by including an interferometer integrated in the resonant cavity. The interferometer acts as an output coupler, determining the level of coupling of the output signal and allowing optimization of the output power level.

Preferably, the interferometer is an antiresonant ring (ARR) interferometer, which results in a higher stability and a wider wavelength range. Nevertheless, the OPO can be implemented using alternative interferometers, such as Michelson, Fabry-Perot or Mach-Zehnder.

The ARR comprises a beamsplitter (BS), which is preferably tuneable, modifying its transmittance and reflectance, and as a consequence, the coupling performed by the ARR. Preferably, the tuning of the BS is performed by rotating it, thus changing the angle of incidence of the beam and modifying the fraction of the beam which is transmitted and reflected.

Two preferred alternatives are considered to allow the alignment of the OPO:
Using an external laser or some extracted signal from the OPO to perform the alignment by adjusting the mirrors of the ARR.
Including an auxiliary cavity, comprising two prisms, one of which is removed after the alignment. Adjusting the mirrors of the ARR is also required.

In yet another preferred alternative, a tunable BS is used whose beamsplitting ratio can be changed, gradually or in steps, by translating or rotating it. In this case, the realignment of the ARR mirrors is not needed.

A series of modifications to the basic OPO of the invention are also disclosed:
Using a frequency-selective element such as an etalon in the ARR.
Including a phase-shifting element in the ARR to perform phase-amplitude conversions.
Using a nonlinear ARR, either with a saturable absorber or with polarization elements and another nonlinear crystal.
Coupling two OPOs.
Generating beams with two different wavelengths in the nonlinear crystal and creating two different optical paths to allow them to oscillate.
Using intracavity double-counterpropagating pumping.

All the described modifications still benefit from the stability, broad wavelength tuning, and the output power level optimization.

These and other advantages will be apparent in the light of the detailed description of the invention

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
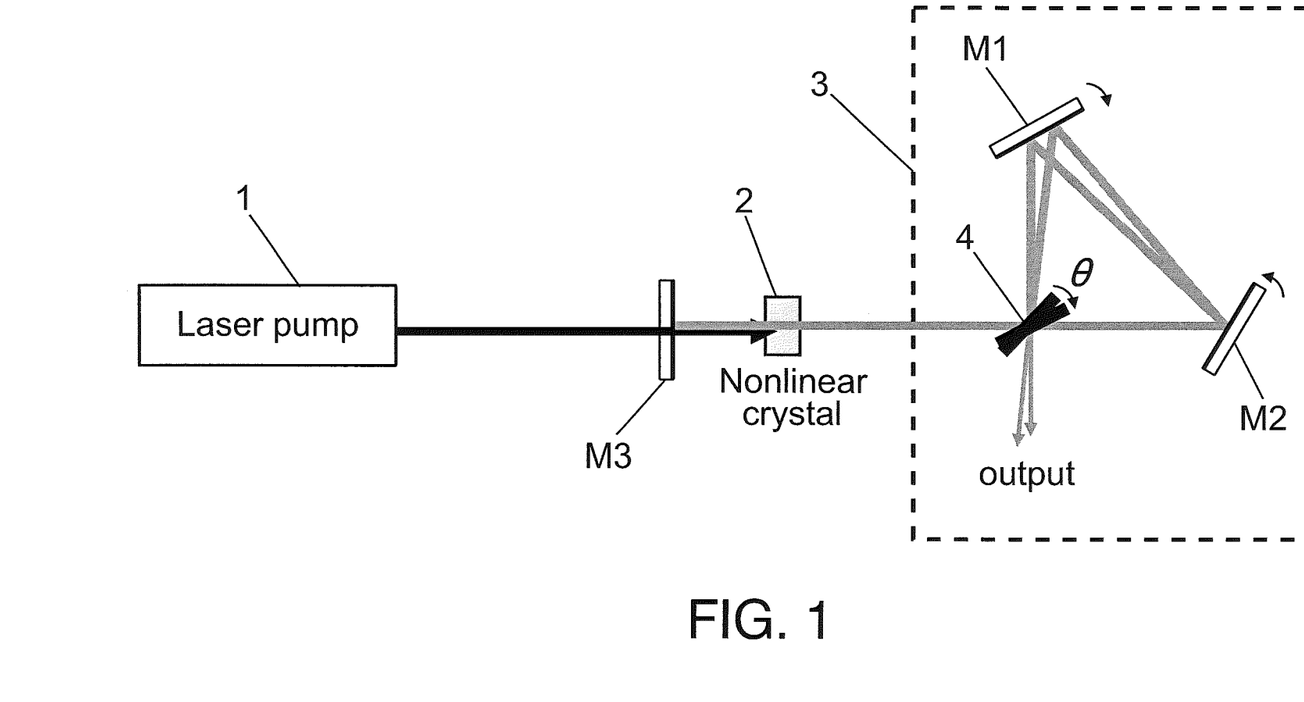
FIG. 1 is a diagram of an optical parametric oscillator with an intracavity ARR according to one of its preferred embodiments.

FIG. 1 shows the architecture of an OPO according to a preferred embodiment of the present invention. The OPO comprises a laser source 1, which pumps a nonlinear crystal 2. The nonlinear crystal converts the input laser wave into two output waves of lower frequency, one of which is the signal wave while the other is the idler. The waves generated in the crystal enter an ARR interferometer 3, which comprises two reflective mirrors (M1 and M2), and a beamsplitter (BS) 4. The interactions of the waves inside the ARR result in an output (or transmitted) beam and a reflected beam. The OPO also comprises a third mirror M3, which prevents the beam reflected by the ARR to go back to the laser source, and returns it to the nonlinear crystal instead.

Unlike lasers systems, in which there is gain storage, the OPO gain is instantaneous. Thus, for synchronously-pumped OPOs and mode-locked OPOs the total length of the OPO, including the linear part and ring, must match the repetition rate of the pump pulses to achieve amplification.

According to Fresnel's equations, the angle of rotation θ of the BS determines the global reflectance and transmittance of the ARR ($R_{ARR}=4R(\theta)T(\theta)$ and $T_{ARR}=|R(\theta)-T(\theta)|^2$), and as a consequence, the output power of the global system. Nowadays there is a wide range of commercial beamsplitters with different splitting ratios that can be provided in a variety of forms such as plates, cubes, films, polka dot, and wire grids with different thickness, materials, and broadband coatings for wavelengths from the visible to the infrared.

Unlike other types of interferometers, such as Fabry-Perot, Michelson or Mach-Zehnder, the behavior of the ARR prevails at all frequencies, since the two counterpropagating waves share the same optical path length around the ring, and is equally valid for pulsed or continuous laser light. It also presents an inherent stability which benefits the global performance of the OPO.

By setting the ARR with a variable beam splitting ratio, an arbitrary and continuously adjustable output coupling can be obtained over a wide bandwidth. Employing such a variable output coupler, the absolute maximum attainable output power for any optical oscillator under a given operating condition can be readily achieved. This technique allows the optimization of extracted power even in the situation where other parameters, such as the pump wavelength or pump power, can change. As such, the technique can also be employed to evaluate other important parameters in laser oscillators such as gain, loss, and efficiency using established methods as the Findlay-Clay analysis.

To align the ARR of the OPO, a possible technique is to inject a reference signal (either from an external laser source or some signal extracted from the OPO) into the ring and observe the interference fringes in the output arm while adjusting the mirrors of the ARR. Another technique is to arrange an auxiliary cavity in one arm of the resonator, employing a pair of prisms and a high reflector. The leakage from the first prism, which is coaxial with the resonator is used to align the ARR. After the alignment, the first prism is removed, leaving the new cavity with the ARR integrated. For simplicity, a smaller ring is recommended to avoid rearrangement of the positions of the mirrors when large adjustments to the angle are required.

Figure 2:
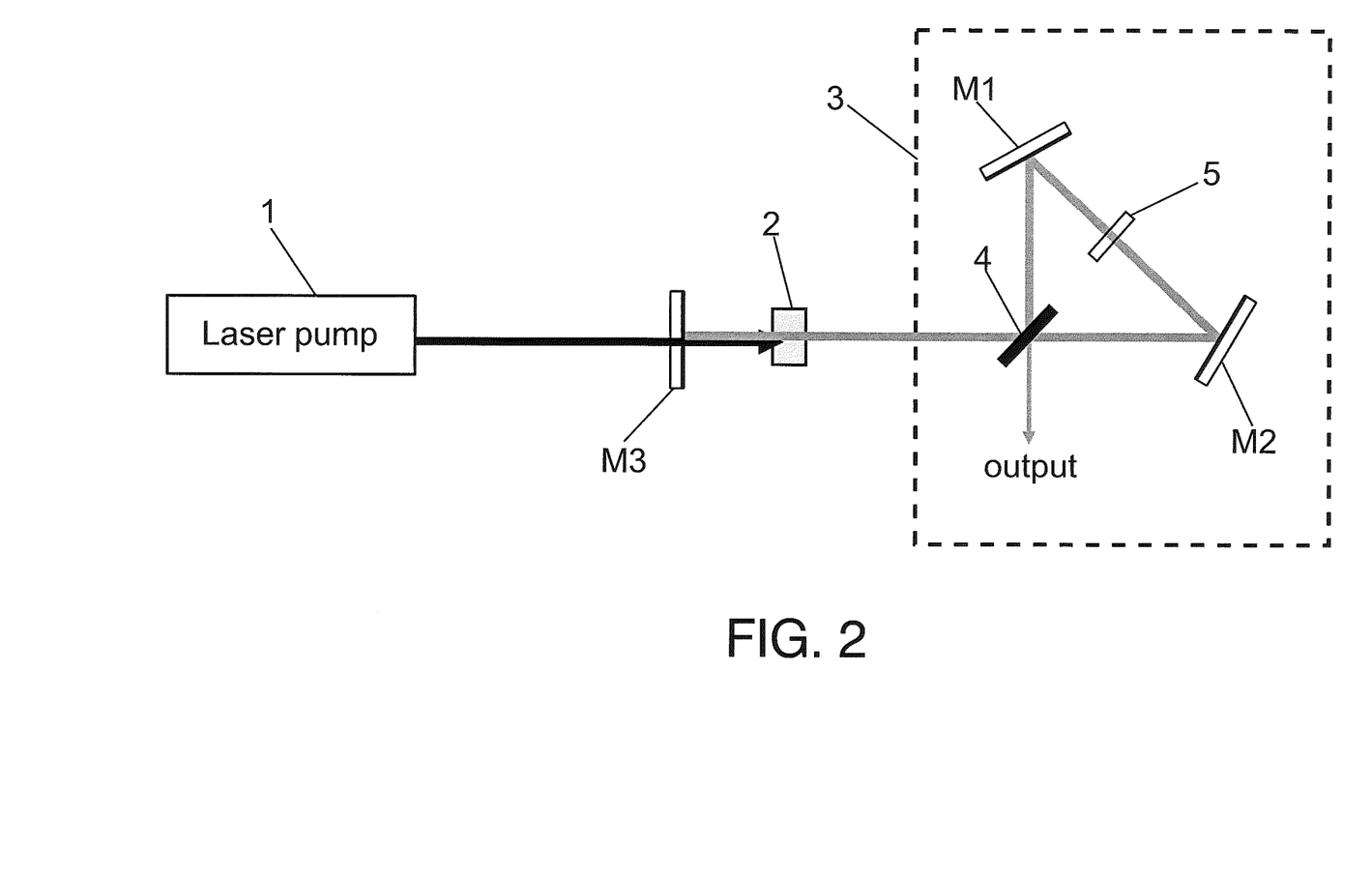
FIG. 2 shows another embodiment which includes frequency filtering.

FIG. 2 presents an OPO with frequency filtering. Normally, there are several longitudinal modes within the gain bandwidth of an OPO that can cause instabilities in frequency and output power due to mode jumping. This negative effect can be circumvented by placing a frequency selective element 5 inside the OPO cavity, where the free-spectral-range (FSR) of the selective element must be larger than the FSR of the OPO ($FSR_{OPO}=c/(2L_{linear}+L_{ARR})$; wherein c is the speed of light, $L_{linear}$ is the length of the linear part of the OPO, and $L_{ARR}$ is the length of the ring cavity). In this situation, only the cavity frequencies that match both the OPO frequencies and those of the etalon will oscillate. One proposal is to insert an etalon inside the ARR.

($FSR_{etalon}=c/2L_{etalon}>>FSR_{OPO}$), wherein $L_{etalon}$ is the length of the etalon, which allows frequency filtering with higher finesse due to the reduction of the insertion losses of the etalon.

Figure 3:
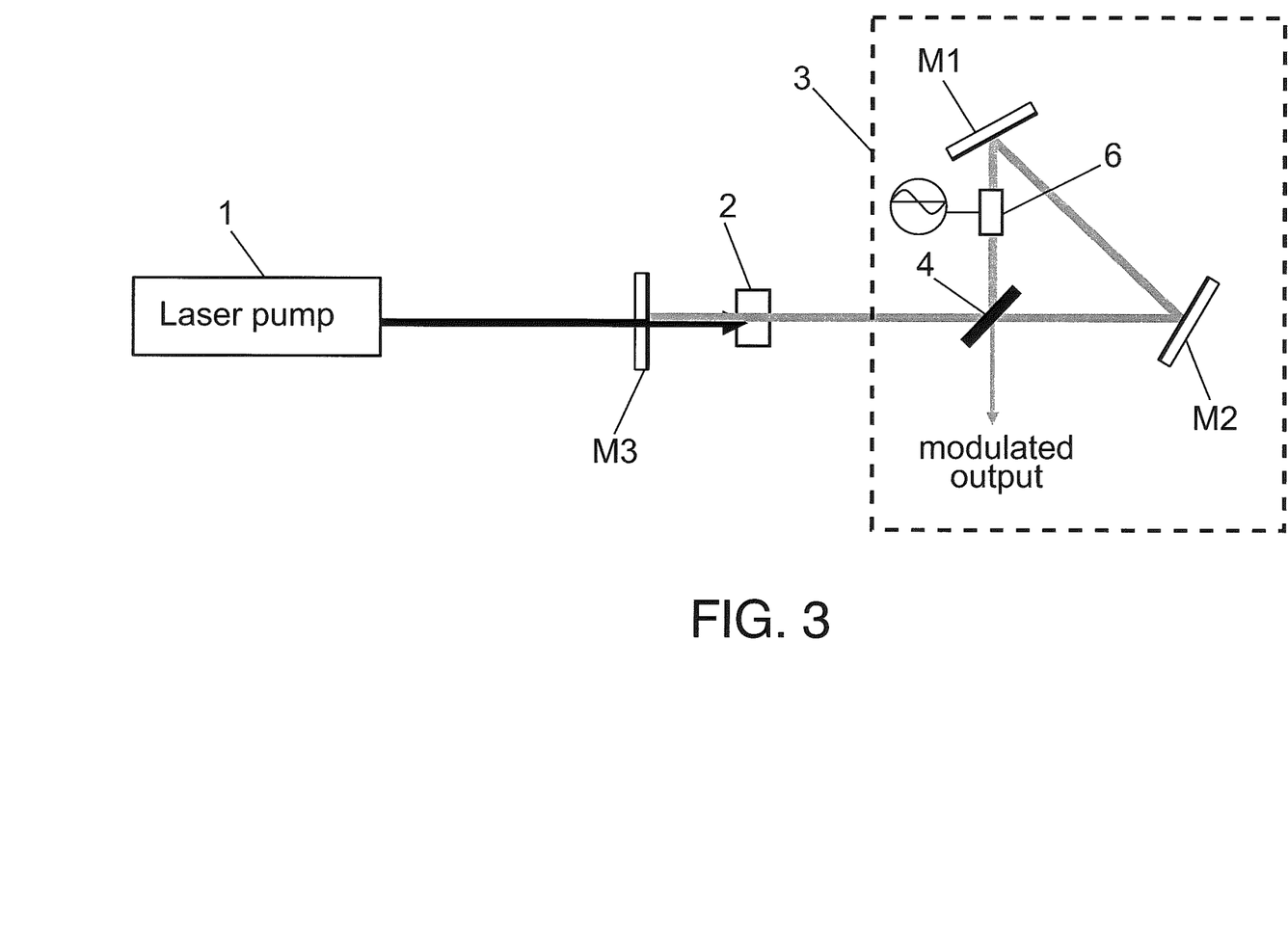
FIG. 3 shows an embodiment which includes phase-amplitude conversion.

In FIG. 3, a phase shifter element 6 is placed inside the ARR to convert the phase modulation into amplitude modulation when the two phase-delayed beams interfere at the beamsplitter. There is a time given by the transit time of the oscillating field inside the ring, in which the two beams are shifted in phase. Different types of phase modulation can be applied depending on the application. For example, a square function that shifts the phase by pi can be used to dump the OPO cavity. Another application consists of applying a sinusoidal RF voltage to an electrooptic modulator (EOM) to get a periodic modulation of the amplitude and synchronize the frequency of the EOM ($\Delta f_{EOM}$) to the optical length of the OPO to achieve mode-locking (by verifying $L_{OPO}=c/\Delta f_{EOM}$).

The nonlinear ARR is a variation of the ARR in which an intensity dependent anisotropic nonlinear media is located inside the ring. Depending on the nonlinear media and the imbalance between the beams inside the ARR, different applications can be figured out.

Figure 4:
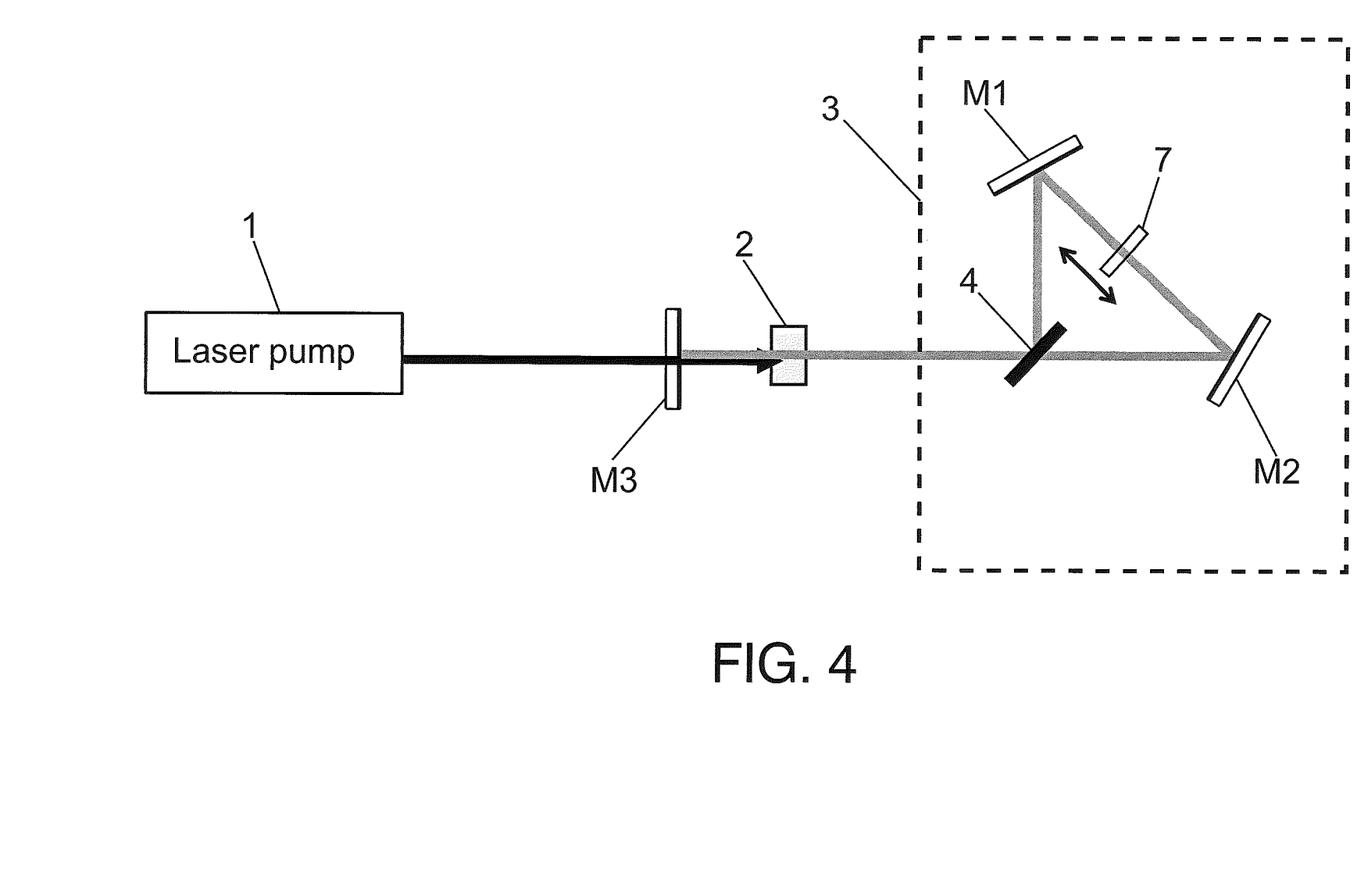
FIG. 4 presents an OPO with passive mode-locking according to another embodiment of the present invention.

FIG. 4 shows an OPO in which passive mode-locking is achieved using a balanced ARR (BS 50/50) in combination with a saturable absorber 7 placed exactly in the middle of the ring so as to collide both counterpropagating beams. The saturable absorber can be shifted to achieve this correct location.

Figure 5:
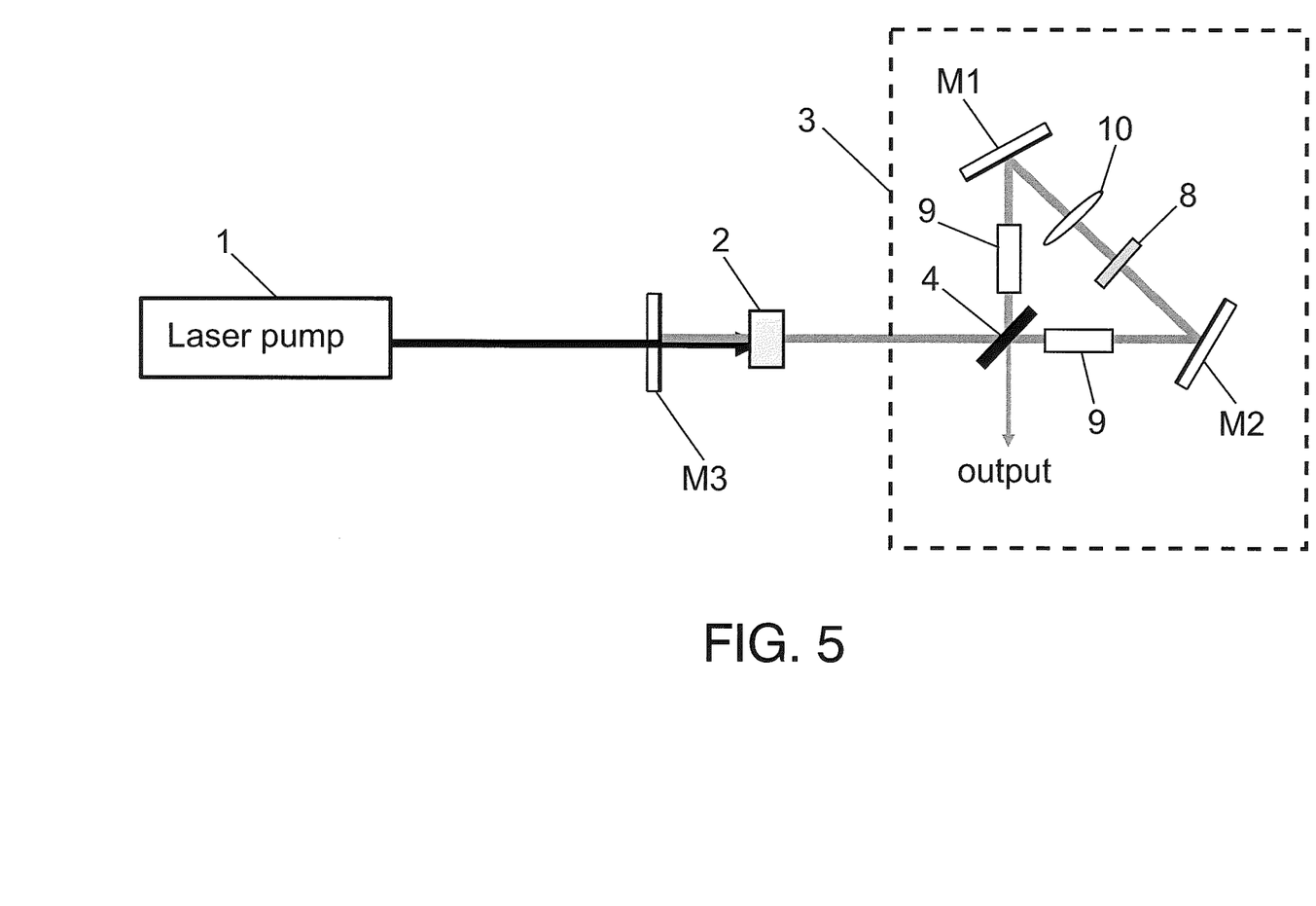
FIG. 5 presents an alternative OPO with passive mode-locking according to another embodiment of the present invention.

FIG. 5 presents another variation which includes polarization elements like waveplates 10 or Faraday rotators 9 to experience nonlinear cross-polarization effects in a nonlinear crystal 8 such as SHG crystal which can change the relative amplitude and phase of the beams.

Figure 6:
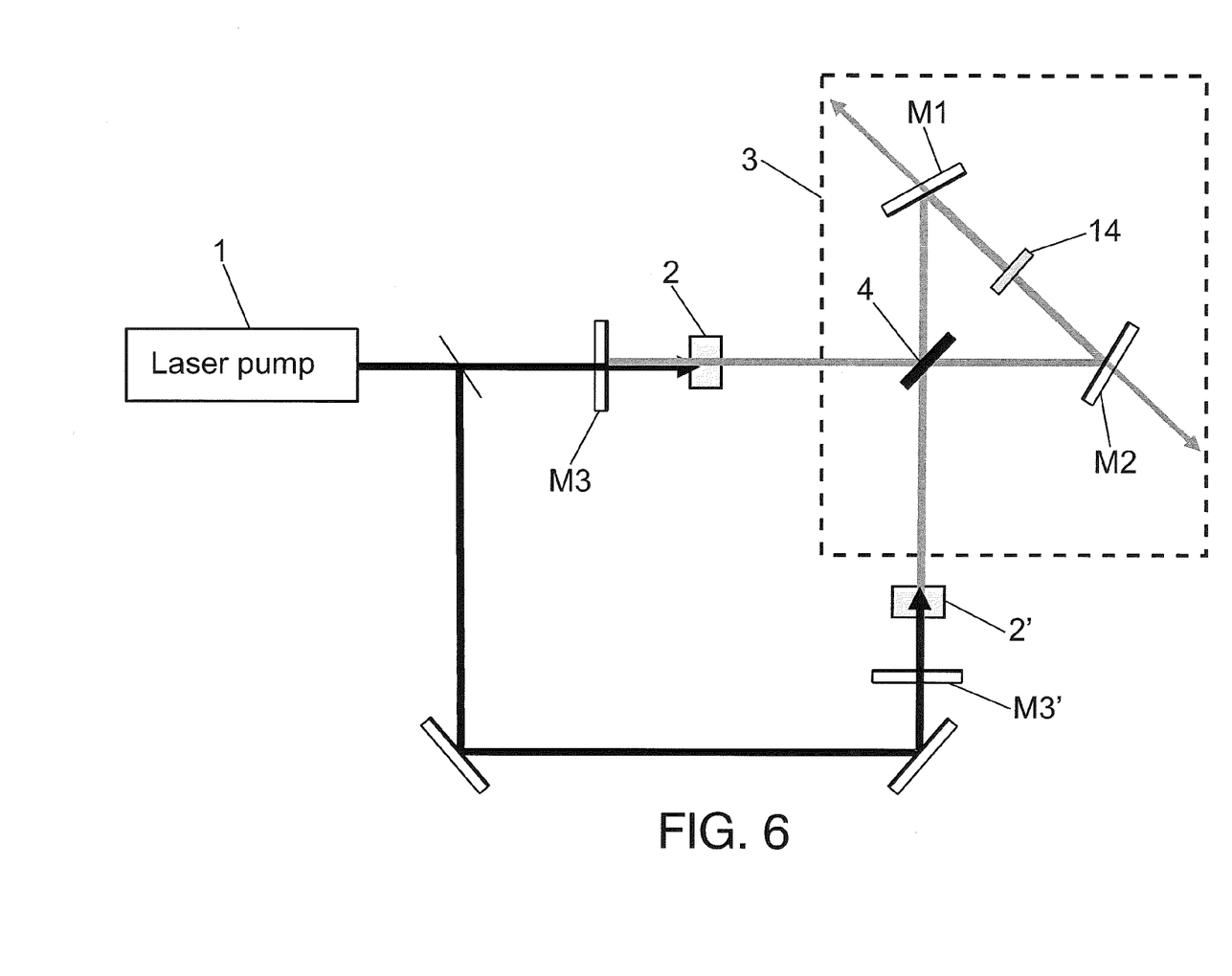
FIG. 6 is a diagram of another embodiment of the present invention which comprises two coupled OPOs.

As depicted in FIG. 6, the deployment of an OPO in each external arm of the ARR allows coupling of two OPOs which can operate independently but sharing a common optical cavity inside the ring. In the figure, both OPOs use the same laser source 1, whose output is then split into two optical paths, one for each OPO. The second OPO thus comprises an independent nonlinear crystal 2', along with another reflective mirror 3'. This way, the OPOs are connected, but intercoupling is avoided between the nonlinear crystals.

This scheme offers the possibility of using a common intracavity element 14 for some other nonlinear processes such as frequency mixing between the two oscillating fields. The arrows going out from mirrors M1 and M2 represent the new frequency generated in the intracavity element 14.

Owing to the wide tunability provided by OPOs, it is worthwhile to point out that one can achieve very flexible phase-matching schemes using different wavelengths (including degeneracy) by independently tuning the two OPOs. As mentioned before, all the fields inside the ARR are sharing the same optical path and thus the stability is really improved.

Figure 7:
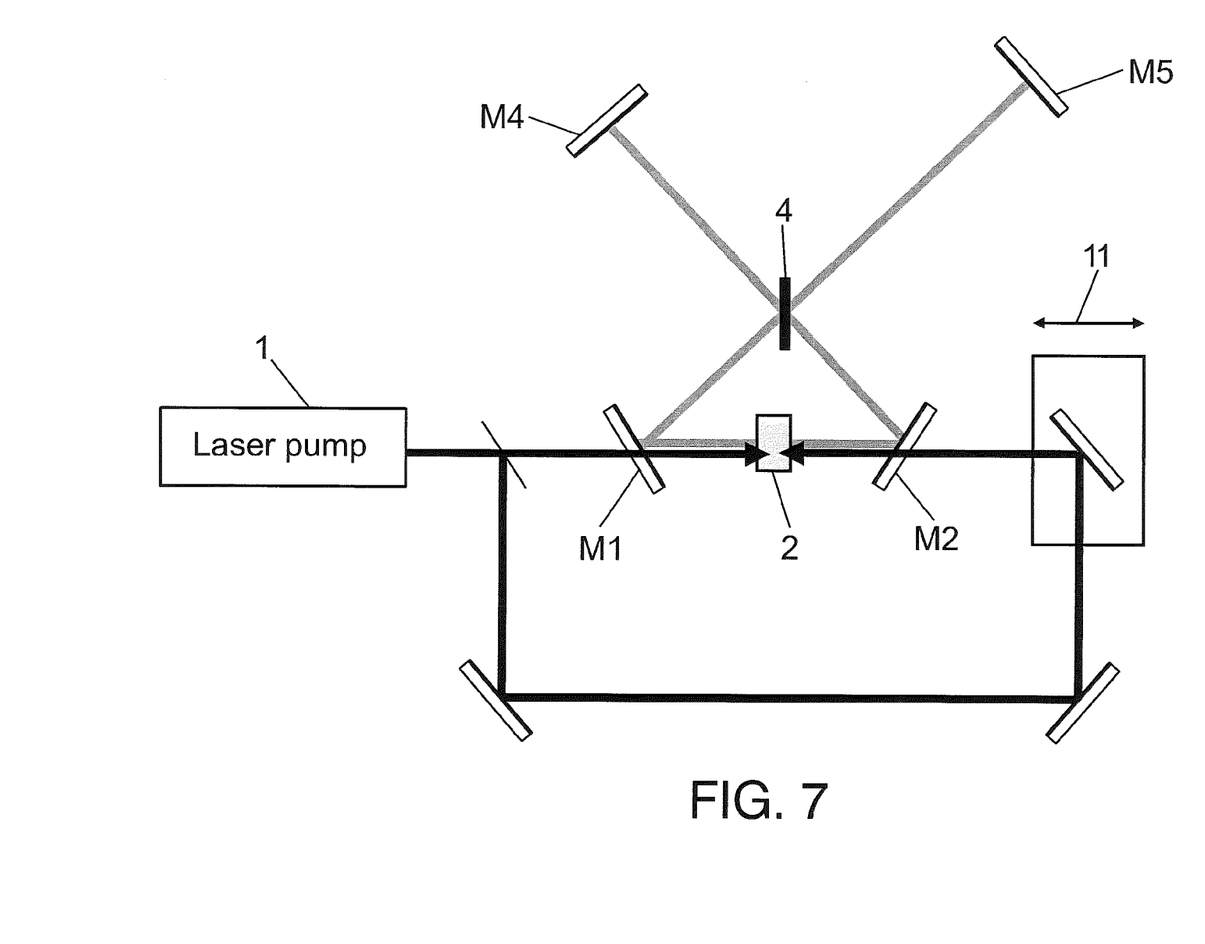
FIG. 7 presents a dual wavelength OPO according to another embodiment of the present invention.

FIG. 7 presents an OPO in which the nonlinear crystal that can simultaneously generate two different wavelength inside the ARR, with two output arms, where each output arm in set to allow the oscillation of only one of the generated wavelengths. The arrangement of the two different output arms can be carried out by using different optics (mirrors M4 and M5) or different optical lengths, as an example. Double pumping might be needed to generate the fields in the two directions inside the ring to obtain the interference at the beamsplitter. The delay introduced by delay line 11 is used in synchronously pumped, pulsed, and mode-locked OPOs to synchronize the pump pulses.

Figure 8:
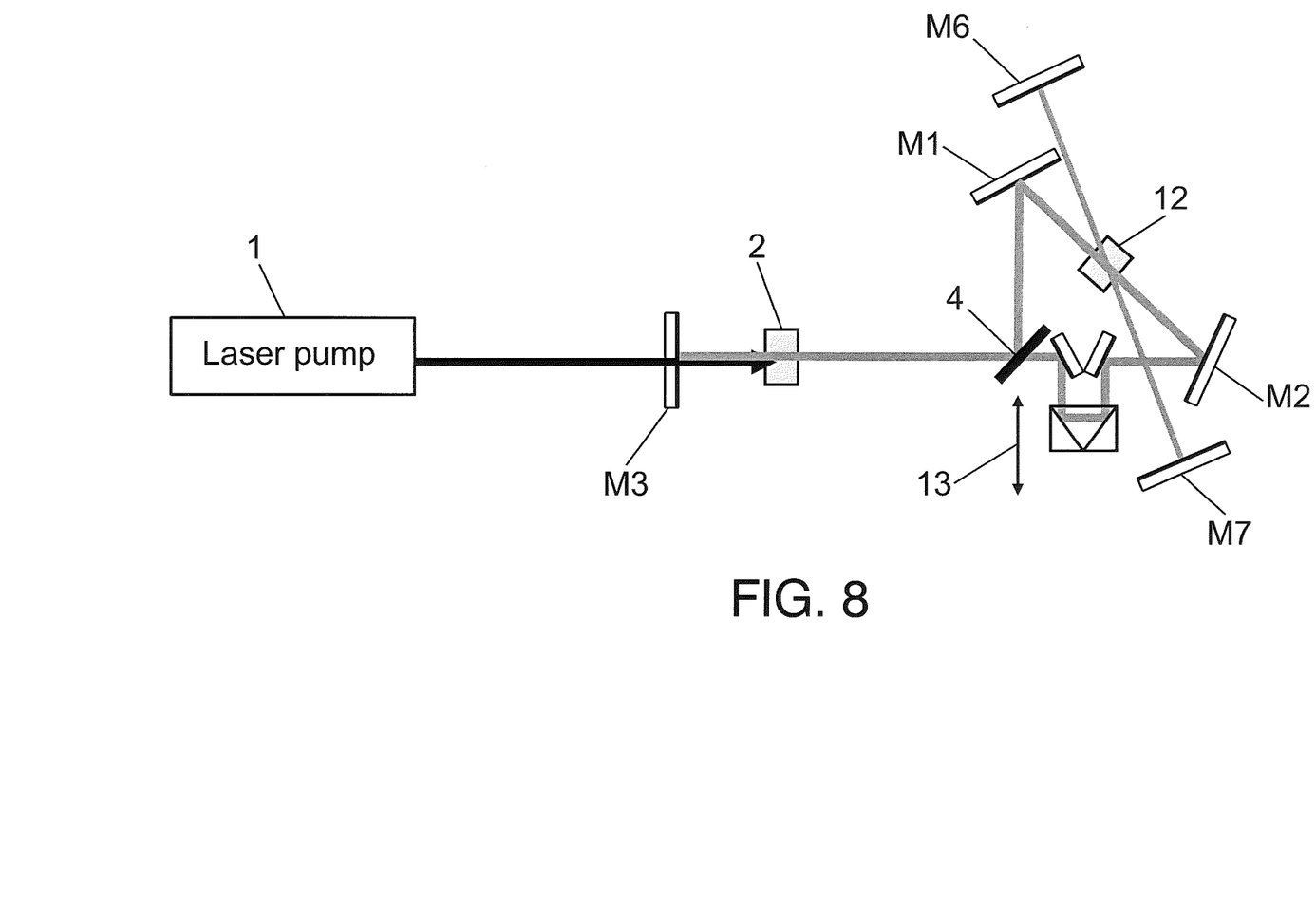
FIG. 8 shows an OPO with intracavity double-counterpropagation pumping according to another embodiment of the present invention.

Finally, the ARR inside the OPO provides two counterpopagating beams that are very well aligned, tunable and strong in intensity since they are intracavity. Therefore, these two beams can be used to double-pump other systems such as mirrorless OPOs, counterpropagating quasi phase-matching materials, four-wave-mixing, and intracavity pumping of other OPOs as indicated in FIG. 8, in which the system comprises an additional nonlinear crystal 12 and mirrors M6 and M7. Additionally, in the case of synchronously-pumped, pulsed, and mode-locked OPOs, a delay line 13 inside the ARR can be used to synchronize the two pulses.

Additionally, the OPO with the ARR contains two counterpropagating beams that, in combination with the pump or some extracted intracavity field, can be used for pump-probe experiments with very high intensity and flexibility in terms of wavelength tunability, pulse delay between the intracavity pulses and sampling positioning.

Also, the ARR can be used as a technique to measure nonlinear optical properties. In this application, the ARR is used to detect very small changes in the phase and amplitude of an optical beam making use of its improved stability. The implementation of the ARR inside the OPO significantly increases the intensity of the beams to enhance the nonlinear effects on the sample to be studied. An example of experimental setup consists of an OPO with an unbalanced ARR, in which the sample is placed indie the ring but not in the centre so as to avoid the overlapping of the pulses. The unbalanced ARR can be adjusted by using a different splitting ratio or using an attenuator, in a way that only one of the beams inside the ring undergoes significant nonlinear process, what will give rise an asymmetry when the two beams recombine at the BS, resulting in a different output. Another possible experiment is based on a balanced ARR, and no attenuation is required. The technique in based on extraction of two beams: one from the counterclockwise direction after passing the sample and the other from the clockwise direction before passing the sample. Then, the two extracted beams are made to interfere, generating a frequency beat note related to their phase difference.

It should also be noticed that the described OPO can additionally be used to implement a gyroscope. The rotation of the OPO with the ARR experiences the Sagnac effect, since the two counterpropagating beams inside the ring see slightly different optical paths. If the sense of rotation is clockwise, the clockwise and counterclockwise beams see longer and shorter path, respectively. The difference in optical path changes the relative phase and, as a result of the interferometric recombination, it appears a frequency beat note related to the length of the ARR and the speed of angular rotation.

As an example of the performance of the described architecture, a particular implementation using a Kerr-lens-mode-locked Ti:sapphire laser at 810 nm, and a periodically-poled $LiNbO_3$ crystal, with an optimized ARR, reaches 200 mW signal output power, which is more than twice that using a 4% commercial output coupler. Output power for all the frequencies of the tuning range 1.35-1.55 microns showed consistently better performance.

The invention claimed is:

1. Optical parametric oscillator comprising
a laser source;
a nonlinear crystal adapted to be pumped by the laser source; and
an optical resonator;
wherein the optical resonator comprises an optical interferometer integrated in a cavity of the oscillator which determines a level of output coupling of the oscillator;
wherein the optical interferometer is an antiresonant ring interferometer which comprises two mirrors and a beamsplitter with a transmittance and a reflectance, wherein the transmittance and reflectance of the beamsplitter determine the level of output coupling of the oscillator; and
wherein the beamsplitter is a beamsplitter with tuneable transmittance and reflectance.

2. Optical parametric oscillator according to claim 1 wherein the transmittance and reflectance of the beamsplitter is tuned by changing the angle of incidence on the beamsplitter.

3. Optical parametric oscillator according to claim 1 wherein the transmittance and reflectance of the beamsplitter is also tuned by translation or rotation of the beamsplitter.

4. Optical parametric oscillator according to claim 1, wherein the mirrors of the antiresonant ring are adjustable and the antiresonant ring is adapted to receive a reference signal for alignment.

5. Optical parametric oscillator according to claim 1, wherein the optical resonator further comprises an auxiliary cavity comprising a first prism, a second prism and a reflector, wherein the first prism is removable and coaxial with the resonator.

6. Optical parametric oscillator according to claim 1, wherein the antiresonant ring further comprises a frequency selective element.

7. Optical parametric oscillator according to claim 1, wherein the antiresonant ring further comprises a phase shifting element.

8. Optical parametric oscillator according to claim 1, wherein the antiresonant ring is a nonlinear antiresonant ring which comprises an intensity dependent anisotropic nonlinear media.

9. Optical parametric oscillator according to claim 8, wherein the antiresonant ring further comprises a saturable absorber in the middle of the antiresonant ring adapted to collide counterpropagating beams.

10. Optical parametric oscillator according to claim 8, wherein the antiresonant ring further comprises polarization elements and an additional nonlinear crystal.

11. Optical parametric oscillator according to claim 1, further comprising an additional oscillator with a second nonlinear crystal, with the two oscillators being coupled by the antiresonant ring.

12. Optical parametric oscillator according to claim 1, wherein the nonlinear crystal is adapted to generate two signals with different wavelengths simultaneously, and wherein the oscillator further comprises two different optical elements to allow oscillation of both signals.

13. Optical parametric oscillator according to claim 1, further comprising an additional optical system adapted to be double-pumped by the two counterpropagating beams of the antiresonant ring.

\* \* \* \* \*

UNITED STATES PATENT AND TRADEMARK OFFICE
CERTIFICATE OF CORRECTION

PATENT NO. : 8,498,043 B2  Page 1 of 1
APPLICATION NO. : 13/025843
DATED : July 30, 2013
INVENTOR(S) : Esteban-Martin et al.

It is certified that error appears in the above-identified patent and that said Letters Patent is hereby corrected as shown below:

On the Title Page Item (73), Assignee, delete "FUNDACION "INSTITUTO DE CIENCIAS FOTONICAS" (ICFO) (ES)" and insert therefor -- INSTITUCIO CATALANA DE RECERA I ESTUDIS AVANCATS, (ES) and FUNDACION "INSTITUTO DE CIENCIAS FOTONICAS" (ICFO) (ES) --.

Signed and Sealed this
Twelfth Day of November, 2013

Teresa Stanek Rea
*Deputy Director of the United States Patent and Trademark Office*